United States Patent [19]
Dalupan

[11] Patent Number: 5,243,950
[45] Date of Patent: Sep. 14, 1993

[54] APPARATUS FOR THE TREATMENT OF GASES IN A POSITIVE CRANKCASE VENTILATION SYSTEM

[75] Inventor: Romulo V. Dalupan, Walcott, Iowa

[73] Assignee: Gekko International, L.C., Davenport, Iowa

[21] Appl. No.: 986,388

[22] Filed: Dec. 7, 1992

[51] Int. Cl.$^5$ .................... F02M 25/06; F02M 27/04
[52] U.S. Cl. ................... 123/573; 123/536; 123/572
[58] Field of Search ............ 123/572, 573, 574, 536, 123/637, 538

[56] References Cited

U.S. PATENT DOCUMENTS

| | | | |
|---|---|---|---|
| 3,878,469 | 4/1975 | Bolasny | 123/538 |
| 4,069,665 | 1/1978 | Bolasny | 123/538 |
| 4,073,273 | 2/1978 | McMahon | 123/538 |
| 4,269,607 | 5/1981 | Walker | 123/573 |
| 4,355,969 | 10/1982 | Nelson et al. | 123/536 |
| 4,409,950 | 10/1983 | Goldberg | 123/573 |
| 4,834,028 | 5/1989 | Oetting | 123/573 |

Primary Examiner—Willis R. Wolfe
Assistant Examiner—M. Macy
Attorney, Agent, or Firm—Dick and Harris

[57] ABSTRACT

An apparatus for the treatment of gases in a positive crankcase ventilation (PCV) system, in an internal combustion engine, is provided with a housing defining a gas treatment chamber. Gas filtering media is passed through the chamber and the gases from the engine crankcase are passed throughout the gas filtering media in the chamber, before the gases are routed into the air intake portion of the engine.

8 Claims, 1 Drawing Sheet

APPARATUS FOR THE TREATMENT OF GASES IN A POSITIVE CRANKCASE VENTILATION SYSTEM

BACKGROUND OF THE INVENTION

The present invention relates in general to pollution control devices and efficiency devices in internal combustion engines. In particular, the present invention is directed to an apparatus to be installed in the positive crankcase ventilation (PCV) system of an internal combustion engine.

In internal combustion engines of the type employing reciprocating pistons which drive a crankshaft to deliver torsional power, for example, a common automobile engine, is well known that a portion of the combustion gases which are formed in the combustion chambers of the cylinders are driven by pressure, as well as the partial suction behind the pistons, passed the pistons toward and into the crankcase area of the engine. This phenomenon is known as "blow-by". These gases which are driven into the crankcase include combustion products such as carbon dioxide, carbon monoxide, as well as partially and completely unburned hydrocarbon fuel molecules. In an effort to improve engine efficiency and reduce automotive emissions, it has become the practice in the automotive industry to connect the crankcase with the air intake portion of the engine so as to draw from the crankcase a portion of these gases which is then directed into the air intake portion of the engine. The heated gases contribute to the operation of the engine by partially elevating the temperature of the incoming air and by passing the partial and unburned hydrocarbon fuel molecules through the engine to complete the combustion process.

As the gasses are passing through the crankcase, however, the gases mix somewhat with the oil vapors and particulate spray which are present in the crankcase during engine operation. These oil-based vapors, particulate materials, dirt and the like, when transmitted into the air intake portion of the engine, actually tend to contribute to the pollution generated by the engine, by contaminating the intake air, as the oil-based materials do not burn properly or completely in the combustion process. In addition, the oil-based vapor and particulate materials also may have a damaging effect on such components as the carburetor or fuel injectors.

As an additional consideration, there are several factors within the environment which contribute to poor combustion in an internal combustion engine, which results in higher emissions of pollutant compounds. These factors include the variable conditions of the atmospheric air, including, among other things, the relative amounts of oxygen and nitrogen, in the air the seasonal changes of ambient temperature, the emission of compounds from industrial smoke stacks and variable levels or exhaust fumes from both diesel and gasoline powered vehicles in road traffic.

The pollutants released by internal combustion engines are particularly troublesome since they may remain at ground level and further contaminate the air quality (oxygen content) flowing into the air intake of an engine, leading to even worse pollutant emission.

In addition, the intermixing of crankcase fumes with ambient intake air has the effect of still further lowering the overall percentage of usable molecular oxygen ($O_2$), available for combustion, relative to the overall volume of gases taken into the cylinders, thus, adversely affecting the combustion efficiency.

Accordingly, it is desirable to provide an apparatus which will permit the recirculation of crankcase fumes back into the intake side of an internal combustion engine.

It is a further object of the invention to provide a crankcase fume recirculation system which is capable of separating out undesired oil-based vapors and particulate matter and the like, prior to returning the crankcase fumes to the intake side of the engine.

Yet another object of the invention is to provide a way to offset the effect of the lowering of the percentage of usable oxygen in the gases taken into the cylinders, which results when crankcase fumes are returned to the intake side of the engine, by making the oxygen in the air present in the crankcase more available for combustion.

These and other objects of the invention will become apparent in light of the accompanying specification, claims and drawings.

SUMMARY OF THE INVENTION

The present invention is an apparatus for the treatment of gases in a positive crankcase ventilation system of an internal combustion engine, in which the gases, containing unburned, usefully combustible hydrocarbon materials as well as pollutant matter, are drawn from the crankcase of the engine and directed to the air intake portion of the engine for recirculation through and further combustion in the engine.

The apparatus comprises a housing, which sealably encloses a gas treatment chamber. A source of filtering media is provided, which is capable of separating the pollutant matter from the gases, upon exposure of the gases to the gas filtering media. First inlet means are arranged in the housing to direct flow of the gas filtering media from the source into the gas treatment chamber. The gas filtering media exits the gas treatment chamber through first outlet means, after the gas filtering media has been exposed to and filtered out the pollutant matter from the gases. The gas filtering media is passed through means for cleaning the gas filtering media, to remove the pollutant matter from the gas filtering media.

The gases are directed into the gas treatment chamber from the crankcase through second inlet means, and are directed out of the gas treatment chamber toward the air intake portion of the engine through second outlet means. Means within the housing are provided to direct the flow of the gases through the gas filtering media, while the gases and the gas filtering media are in the gas treatment chamber.

In the preferred embodiment of the invention, means for negatively ionizing at least a portion of the gases within the gas treatment chamber are also provided, including negative ion emitter means, operably associated with the housing, with at least one ion emitter probe projecting into the gas treatment chamber. Means for constraining the gases to flow past the at least one ion emitter probe are also provided.

The source of gas filtering media is preferably constructed as a reservoir of liquid which is connected to the first inlet means and the first outlet means by suitable conduit. Pumping means continuously pump the liquid from the reservoir, into the gas treatment chamber, through the means for cleaning the gas filtering media, and back to the reservoir, which the internal combustion engine is operated. The means for cleaning the gas filtering media comprise further filter means arranged in the conduit, between the first outlet means and the reservoir, for removing the pollutant matter from the liquid. In the preferred embodiment of the invention, the liquid employed is water. Alternatively, a mixture of water and an anti-freezing agent may be used.

The gases are forced to flow through the gas filtering media, by collecting the liquid within the gas treatment chamber, so as to cause the liquid to surround the second inlet means, the liquid physically separating the pollutant matter from the gases.

DETAILED DESCRIPTION OF THE DRAWINGS

Figure 1:
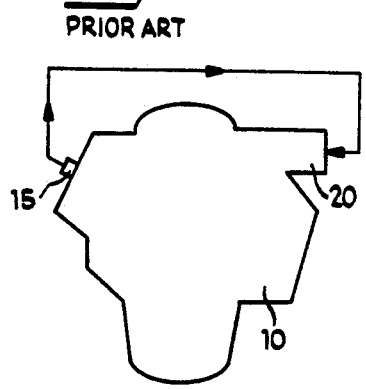
FIG. 1 is a schematic representation of an internal combustion engine having a positive crankcase ventilation (PCV) system.

While this invention is susceptible of embodiment in many different forms, there is shown in the drawings and will be described herein in detail, several specific embodiments, with the understanding that the present disclosure is to be considered as an exemplification of the principles of the invention and is not intended to limit the invention to the embodiments illustrated.

An internal combustion engine system is shown, in schematic, in FIG. 1. Engine 10 may be of any known configuration. Positive crankcase ventilation (PCV) valve 15 is arranged on engine 10 in communication with the lubrication circuit (not shown) of the engine, which includes the crank shaft crankcase. In the configuration of the prior art, the PCV valve 15 is connected directly to the air intake side 20 of the engine, to the carburetor or air intake manifold, in the case of an injection system engine. The fumes, which are drawn by suction from the lubrication circuit into the air intake side of the engine contain, in addition to the unburned or partially burned hydrocarbon fuel molecules, oil-based vapor and particulate matter from the lubricating oil in the internal lubrication circuit of the engine, as well as air containing oxygen. The oil-based vapor and particulate matter are both potentially damaging to the engine components on the intake side, and, as well, do not burn cleanly and can therefore contribute to the pollutant emissions from the engine.

Figure 2:
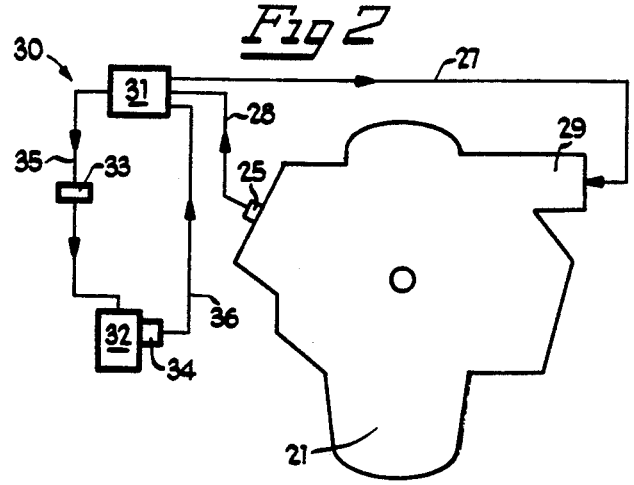
FIG. 2 of the schematic representation of an internal combustion engine, showing the positive crankcase ventilation system with the apparatus of the present invention.

The internal combustion engine system shown schematically in FIG. 2 incorporates the invention of the present application. Engine 21 has provided thereon PCV valve 25. However, between PCV valve 25 and air intake 29, gas treatment apparatus 30 is provided. Conduit 27 connects gas treatment apparatus 30 to air intake 29, while conduit 28 connects PCV valve 25 to gas treatment apparatus 30. Gas treatment apparatus 30 includes main unit 31 and filter media reservoir 32 and in-line filter 33. The filtering media used is water, preferably, although a water and antifreezing agent mixture may also be employed. Pump 34 may be built into reservoir 32 or it may be placed somewhere along conduits 35 or 36. Pump 34 may be of any suitable known configuration, and is, in the preferred construction of the apparatus, connected to the internal combustion engine 21's control system (not shown), such that pump 34 is activated and operating only when engine 21 is operating.

Figure 3:
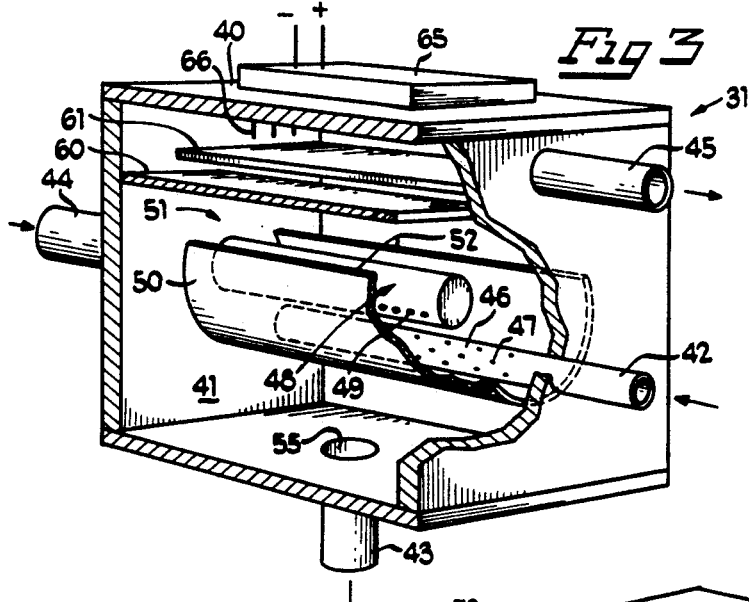
FIG. 3 is an enlarged perspective view of the gas treatment chamber, showing the particular components therein.

Main unit 31 is shown in enlarged, perspective, sectional view in FIG. 3, a sidewall and part of an end wall being omitted for clarity. Housing 40 encloses gas treatment chamber 41. Inlet 42 and outlet 43 connect chamber 41 with conduits 36 and 35, respectively, leading from and to reservoir 32. Inlet 44 communicates with positive crankcase ventilation valve 25, while outlet 45 leads to air intake 29.

In a preferred embodiment of the invention, housing 41 may typically be fabricated from aluminum or other suitable material which is not subject to attack by heat, vibration, or the corrosive combustion by-product gases which will pass through the device. Inlets 42 and 44, and outlets 43 and 45 may be pipe fittings of conventional construction, which may typically be formed from brass, copper or the like.

Within housing 41, from inlet 42, elongated cylindrical spout 46 is provided, which has arranged along its length a number of apertures 47. Similarly, from inlet 44, spout 48 projects into chamber 41 and is provided with apertures 49 along its lower side. Both spout 46 and spout 48, which are arranged substantially parallel to and in close proximity to one another, have closed ends and are partially surrounded by trough 50, which has lengthwise-extending gap 51.

Baffles 60 and 61 are arranged within housing 40 to permit gaseous communication from spout 48 to outlet 45. However, the flow is controlled by the presence of the baffle.

Mounted onto housing 40 is negative ion emitter 65, which has probes 66 projecting into chamber 41, in the region of camber 41 which is above baffles 60 and 61. Any gas or air which is proceeding through chamber 41 toward conduit 45 must substantially pass in the vicinity of probes 66. Negative ion emitter 65 may be any one of a number of known ion emitter devices, such as commercially available air cleaner/purifier/ionizers including: the Bionaire model nos. F70, F150, F250, etc.; the Trion model nos. 8310, 83120, 442501, etc ; pollenex Corp. model nos. AT 100, AT 101, AT 102, etc.; Norelco model nos. CAM 770, CAM 880, CA 110; Sound Design model nos. CA 052, CA 552, AC 80; Holmes Product model no. HAP 200; and Kenmore model nos. 83303, 32062. Negative ion emitter 65 is preferably connected to the vehicle's electrical system and the engine control system (not shown) in a conventional manner to insure that emitter 65 only operates when engine 21 is operating.

During operation of engine 21, pump 34 is activated and supplies, through conduit 36, water through inlet 42, through spout 46 and out through apertures 47. As the water leaves apertures 47, it begins to accumulate in trough 50, rising toward gap 51. The power and speed of pump 34 may be advantageously designed so that the water flow establishes a steady state in which the water level within trough 50 is, at all times, spilling over edge 52 of gap 51 and spout 48 is, at all times, completely submerged.

When engine 21 is running, a vacuum is generated at air intake 29 which tens to draw fumes from PCV valve 25, through conduit 28, through gas treatment apparatus 30, and through conduit 27 to air intake 29. From conduit 27, the fumes travel into housing 40 through inlet 44 and into spout 48. Since spout 48 is completely submerged in water, the fumes will escape through apertures 49 in the form of bubbles which will rise through the water in trough 50 and emerge at the surface of the water in trough 50. During this process, the oil-based vapors and particulate materials will condense and collect within trough 50 and thus be separated from the desired hydrocarbon materials which remain in gaseous form. The oil-based vapors and particular materials are, because of the continuously flowing water, driven over edge 52 of trough 50 and carried down aperture 55 through outlet 43 back toward reservoir 32. However, in-line filter 33 is provided in conduit 35 which traps the pollutant materials, removing them from the water so that the water which returns to reservoir 32 is substantially clean and ready for return through pump 34 to housing 40.

While the pollutant materials have been separated from the hydrocarbon gases and removed, the hydrocarbon gases and crankcase air rise within chamber 41 under the impetus of the suction created in outlet 45. Also, it is possible that some additional oxygen may be drawn from the liquid filter media during the bubbling of the gases through it. The gases pass around baffles 60 and 61, past negative ion emitter probes 66 and on to outlet 45. Along with the hydrocarbon gases, a certain quantity of water vapor will rise with and be carried by the hydrocarbon gases out through outlet 45. These water vapor molecules will become negatively charged as a result of their passing in the vicinity of the negative ion emitter probes 66.

The filtered hydrocarbon gases, being cleaned of the pollutant oil-based vapors and particulate matter, will be burned cleanly with improved, more complete combustion in engine 20. In addition, the hydrocarbon gases will still be at a substantially higher temperature than the ambient air being inletted into the engine, and so will have a beneficial pre-heating effect which will also improve the efficiency of the combustion.

It is also believed that the operation of the apparatus of the present invention provides for the supply of more available oxygen for combustion, to help overcome the effects of pollutants in the air intake mixture, from both ambient air and the returned crankcase fumes, which lower the percentage of oxygen in the air intake mixture. This extra or more available oxygen may be supplied for the crankcase air, or it may also may be released from the liquid filtering media, as the crankcase gases are bubbled through it. In either event, as the oxygen in the gases rising through the apparatus pass the negative ion emitter, the oxygen becomes negatively charged, and is more amenable to combustion. In addition, the water vapor also rising through may also become negatively charged and upon mixing with the inletted air, make the oxygen in inletted air also more amenable to combustion.

The imposition of the negative charge to the oxygen is believed to have a further beneficial effect, in that it appears to actively assist in preventing corrosion within the engine which might otherwise result from the introduction of water vapor or even positively charged oxygen, into the engine, particularly the carburetor and/or combustion chambers.

In addition, the negatively charged water vapor is believed to reduce the combustion flash point or maximum burning temperature within the combustion chamber. By lowering the flash point, there is a reduced tendency for the generation of nitrogen oxide compounds (NOX). Such reduction in NOX emissions has been observed in the operation of the apparatus of the present invention.

The operation of apparatus 30 is also believed to have the effect of retarding the spontaneous detonation (knocking) of the gasoline-intake air mixture within the combustion chamber. This effectively permits an engine to run at a higher compression ratio than would otherwise be possible. Engine operating efficiency, and fuel consumption efficiency, for gasoline spark-ignition engines, generally, increases with increasing compression ratio.

Additional effects of the operation of apparatus 30 are believed to include the elimination of dry burning conditions in the combustion chamber, (due to the presence of the water vapor) which is believed to increase engine longevity, and the reduction of carbon particulate emissions through the remove of the oil-based vapors from the PCV line.

Figure 4:
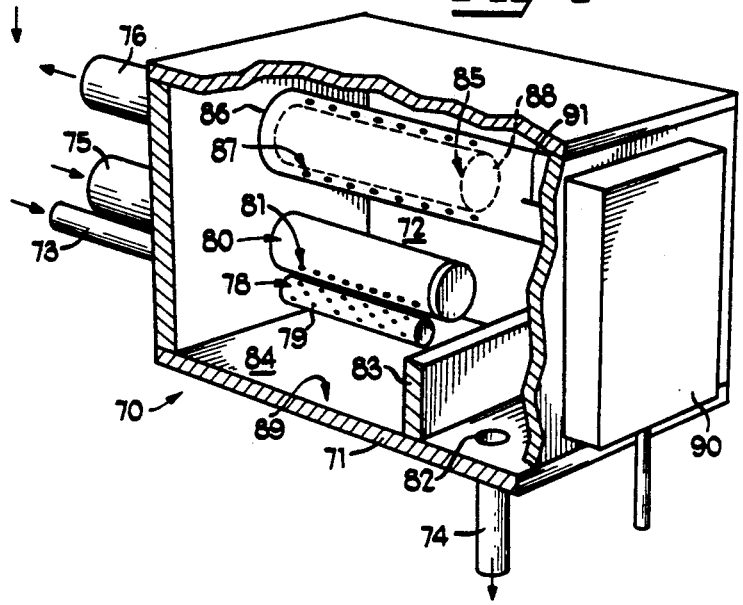
FIG. 4 is a perspective view, partly in section, showing an alternative embodiment of the gas treatment chamber and components therein.

The configuration of main unit 31, as seen in FIG. 3, is an embodiment which may be appropriate for a larger multi-cylinder engine, such as a six- or eight-cylinder engine. However, the baffle configuration in such a main unit 31, which provides a certain amount of resistance to the flow of gases, relative to the suction generated by the engine, may prove to have too much flow resistance for a smaller engine, such as the four-cylinder engines prevalent today. Accordingly, an alternative main unit 70 is shown in FIG. 4.

In the embodiment of the main unit, for use in smaller engine vehicles, main unit 70 comprises housing 71, into which are provided inlet 73 and outlet 74 for the filtering water circulation. Inlet 75 and outlet 76 are provided for the entry and exit of the crankcase gases. Inlet 73 leads to spout 78, which has a number of apertures 79 provided along its bottom for the escape of the water, spout 78 having a closed end. Similarly, inlet 75 has a spout 80, also having a closed end. Apertures 81 are provided along the length of spout 80 for the escape of the crankcase gases. Outlet 74 connects with housing 71 through aperture 82. Separating spouts 78 and 80 from aperture 82 is a dam 83 which extends across the width of housing 71, and has a height which is slightly greater than the height of the upper surfaces of spout 80 above bottom wall 89 of housing 71.

Outlet 76 is connected to the interior of chamber 72 by an outlet spout 85. Outlet spot 85 is completely surrounded by a baffle 86 which is cylindrical in shape and extends the entire length of housing 71. Baffle 86 is provided with a number of apertures 87, which permit gases coming from spout 80 to reach the opening 88 at the end of outlet spout 85. Negative ion emitter 90 is mounted to the side of housing 71, adjacent opening 88 in outlet spout 85, and has probe 91 extending into housing 71 and into the opening 88 of outlet spout 85.

The operation of main unit 70 is substantially identical with regard to main unit 31. Inlet 73 and outlet 74 are connected to a similar arrangement of reservoir, pump and filter as previously described. The pump (not shown) is appropriately configured to supply water into inlet 73 at such a rate that, as water is supplied through apertures 79, the water will begin to collect and pool in area 84 of chamber 72. As the water level rises, it will proceed to cover and ultimately completely submerge spout 80 of inlet 75. Since the pump will not supply water to main unit 71 unless the engine is running, the force of the gases being expelled through apertures 81 of spout 80 will prevent any water from flowing into spout 80. The water level will continue to rise until it attains the level of the top of dam 83, at which point it will spill over and drain outward through aperture 82 of outlet 74. As the gases, containing the desired combustible hydrocarbons and the undesired pollutant materials, escape from apertures 81, the pollutant materials will condense and coagulate and become physically separated from the still gaseous hydrocarbon fumes. The pollutant materials will then be washed over dam 83 by the flow of water and carried out aperture 82 to be filtered from the water in the manner previously described. The gases will rise in chamber 72, drawn by the suction created in the line connected to outlet 76, which in turn is connected to the air intake manifold or carburetor. The gases will be forced to pass through apertures 87 and be drawn toward opening 88 of outlet spout 85. In doing so, the gases and the accompanying water vapor, will be forced to pass by probe 91 of negative ion emitter 90, and the water vapor will become negatively charged.

It has been shown that through the operation of such an apparatus as described in these embodiments, the presence of the water vapor acts to lower the flash temperature within the combustion chamber, thus preventing the extremely high undesired burning temperatures which are known to lead to the creation of the nitrogen oxide compounds (NOX), which are a major pollutant component of internal combustion engine exhaust. Improved combustion is also obtained, in that unburned and partially-burned hydrocarbons being recycled through the engine are again exposed to the combustion process and are more fully utilized.

This configuration shown in FIG. 4 is known to provide somewhat less resistance to the flow of gases through the housing, and accordingly may be advantageously used in smaller internal combustion engines which are not capable of generating the levels of suction at the intake side which are possible in larger engines.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for the treatment of gases in a positive crankcase ventilation system of an internal combustion engine, in which said gases, containing unburned, usefully combustible hydrocarbon materials, and pollutant matter, are drawn from said crankcase of said engine, and directed to an air intake portion of said engine for recirculation through and further combustion in said engine, said apparatus for the treatment of gases in a positive crankcase ventilation system comprising:
   a housing, sealably enclosing a gas treatment chamber;
   a source of gas filtering media, capable of separating said pollutant matter from said gases, upon exposure of said gases to said gas filtering media;
   first inlet means operably arranged in said housing for directing flow of said gas filtering media from said source into said gas treatment chamber;
   first outlet means operably arranged in said housing for directing flow of said gas filtering media back toward said source from said gas treatment chamber, after treatment of said gases;
   means for cleaning said gas filtering media after said gas filtering media has been exposed to and has filtered said gases, to remove said pollutant matter from said gas filtering media;
   second inlet means operably arranged in said housing for directing flow of said gases from said crankcase into said gas treatment chamber;
   second outlet means operably arranged in said housing for directing flow of said treated gases, after exposure to said gas filtering media, from out of said gas treatment chamber toward said air intake portion of said engine; and
   means for directing flow of said gases through said gas filtering media, while said gases and said gas filtering media are in said gas treatment chamber.

2. The apparatus for treating gases according to claim 1, further comprising:
   means for negatively ionizing at least a portion of the gases within said gas treatment chamber, after said separation of said pollutant matter, prior to exit of said gases from said gas treatment chamber.

3. The apparatus for treating gases according to claim 2, wherein said means for negatively ionizing gases within said gas treatment chamber comprises:
   negative ion emitter means, operably associated with said housing, and including at least one negative ion emitting probe projecting into said gas treatment chamber; and
   means for constraining said flow of said gases to pass said negative ion emitting probe, prior to exit of said gases from said gas treatment chamber.

4. The apparatus for treating gases according to claim 1, wherein said source of gas filtering media comprises:
   a reservoir of liquid;
   conduit means, operably connecting said liquid reservoir to said first inlet and said first outlet;
   pumping means, operably configured to continuously pump liquid into said gas treatment chamber, from said reservoir, and out of said gas treatment chamber, through the means for cleaning the gas filtering media, back to said reservoir, during operation of said internal combustion engine.

5. The apparatus for treating gases according to claim 4, wherein said means for cleaning said gas filtering media comprises:
   filter means operably arranged in said conduit, between said reservoir, and said first outlet means in said gas treatment chamber, for removing said pollutant matter from said liquid.

6. The apparatus for treating gases according to claim 5 wherein said liquid is water.

7. The apparatus according to claim 5 wherein said liquid is a mixture of water and an anti-freezing agent.

8. The apparatus for treating gases according to claim 4 wherein said means for directing flow of said gases through said gas filtering media comprises:
   means for collecting said liquid within said gas treatment chamber, so as cause said liquid to surround said second inlet means to force said gases to be passed through said liquid, said liquid physically separating said pollutant matter from said gases.

* * * * *

UNITED STATES PATENT AND TRADEMARK OFFICE
CERTIFICATE OF CORRECTION

PATENT NO.  : 5,243,950
DATED       : September 14, 1993
INVENTOR(S) : Romulo V. Dalupan It is certified that error appears in the above-indentified patent and that said Letters Patent is hereby corrected as shown below:

Col. 4, line 49    Delete "etc", and insert instead -- etc. --.

Col. 4, line 49    Delete "pollenex", and insert instead -- Pollenex --.

Col. 5, line 2     Delete "tens", and insert instead -- tends --.

Signed and Sealed this

Nineteenth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,243,950
DATED : September 14, 1993
INVENTOR(S) : Romulo V. Dalupan It is certified that error appears in the above-identified patent and that said Letters Patent is hereby corrected as shown below:

Col. 5, line 52      Delete "may" after "also".

Col. 6, line 23      Delete "remove", and insert instead -- removal --.

Col. 8, line 64      Insert "to" after "as".

Signed and Sealed this

Twenty-fourth Day of May, 1994

Attest:

BRUCE LEHMAN

*Attesting Officer*      *Commissioner of Patents and Trademarks*